US011579954B2

(12) United States Patent
Kuris et al.

(10) Patent No.: US 11,579,954 B2
(45) Date of Patent: Feb. 14, 2023

(54) DATA COLLECTING IN ISSUE TRACKING SYSTEMS

(71) Applicant: Red Hat, Inc., Raleigh, NC (US)

(72) Inventors: Eran Kuris, Ra'anana (IS); Arie Bregman, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/360,545

(22) Filed: Jun. 28, 2021

(65) Prior Publication Data

US 2022/0413954 A1 Dec. 29, 2022

(51) Int. Cl.
*G06F 11/00* (2006.01)
*G06F 11/07* (2006.01)
*G06F 21/44* (2013.01)

(52) U.S. Cl.
CPC ...... *G06F 11/0709* (2013.01); *G06F 11/0778* (2013.01); *G06F 11/0784* (2013.01); *G06F 11/0787* (2013.01); *G06F 21/44* (2013.01)

(58) Field of Classification Search
CPC ............ G06F 11/0709; G06F 11/0778; G06F 11/0784; G06F 11/0787; G06F 11/3664; G06F 21/44; G06F 21/62; G06F 21/6272; G06F 21/6218; G06F 21/10; G06F 8/70; H04L 63/0281; H04L 63/08; H04L 41/5074
See application file for complete search history.

(56) References Cited

U.S. PATENT DOCUMENTS

| | | | |
|---|---|---|---|
| 3,713,531 A | 1/1973 | Doumas et al. | |
| 9,304,796 B1* | 4/2016 | Douglas | G06F 11/079 |
| 9,465,725 B2 | 10/2016 | Maczuba | |
| 9,626,239 B2 | 4/2017 | Strode et al. | |
| 10,162,740 B1 | 12/2018 | Setty et al. | |
| 2019/0347148 A1 | 11/2019 | Gomes Pereira et al. | |
| 2020/0104125 A1 | 4/2020 | Pechacek et al. | |
| 2020/0241945 A1* | 7/2020 | Sterioff | G06F 11/0787 |
| 2021/0055983 A1* | 2/2021 | Constantin | G06F 11/0751 |
| 2021/0303446 A1* | 9/2021 | Sukhyani | G06F 11/3692 |

* cited by examiner

*Primary Examiner* — Marc Duncan
(74) *Attorney, Agent, or Firm* — Womble Bond Dickinson (US) LLP

(57) ABSTRACT

A system and method for allowing an assignee to rapidly collect data about a bug/error that is associated with the execution of a software application on a computing device. The method includes including receiving, from a client device, a request to resolve an error associated with an execution of an application on a remote server. The request includes configuration information for connecting to the remote server and an identifier to a component of the application. The method includes determining one or more files associated with the component of the application. The method includes establishing a connection to the remote server using the configuration information. The method includes retrieving the one or more files from the remote server via the connection. The method includes granting, to an assignee device, access to the one or more files that were retrieved from the remote server.

20 Claims, 5 Drawing Sheets

DATA COLLECTING IN ISSUE TRACKING SYSTEMS

TECHNICAL FIELD

The present disclosure relates generally to software development, and more particularly, to systems and methods for allowing an assignee to rapidly collect data about a bug (error) that is associated with the execution of a software application on a computing device.

BACKGROUND

A software bug is an error, flaw, failure or fault in a computer program or system that causes it to produce an incorrect or unexpected result, or to behave in unintended ways. A bug may arise from a mistake and error made in either a program's source code or its design, or in components and operating systems used by such programs. Some bugs may be caused by compilers producing incorrect code. A program that contains a large number of bugs, and/or bugs that seriously interfere with its functionality, is said to be buggy or defective.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
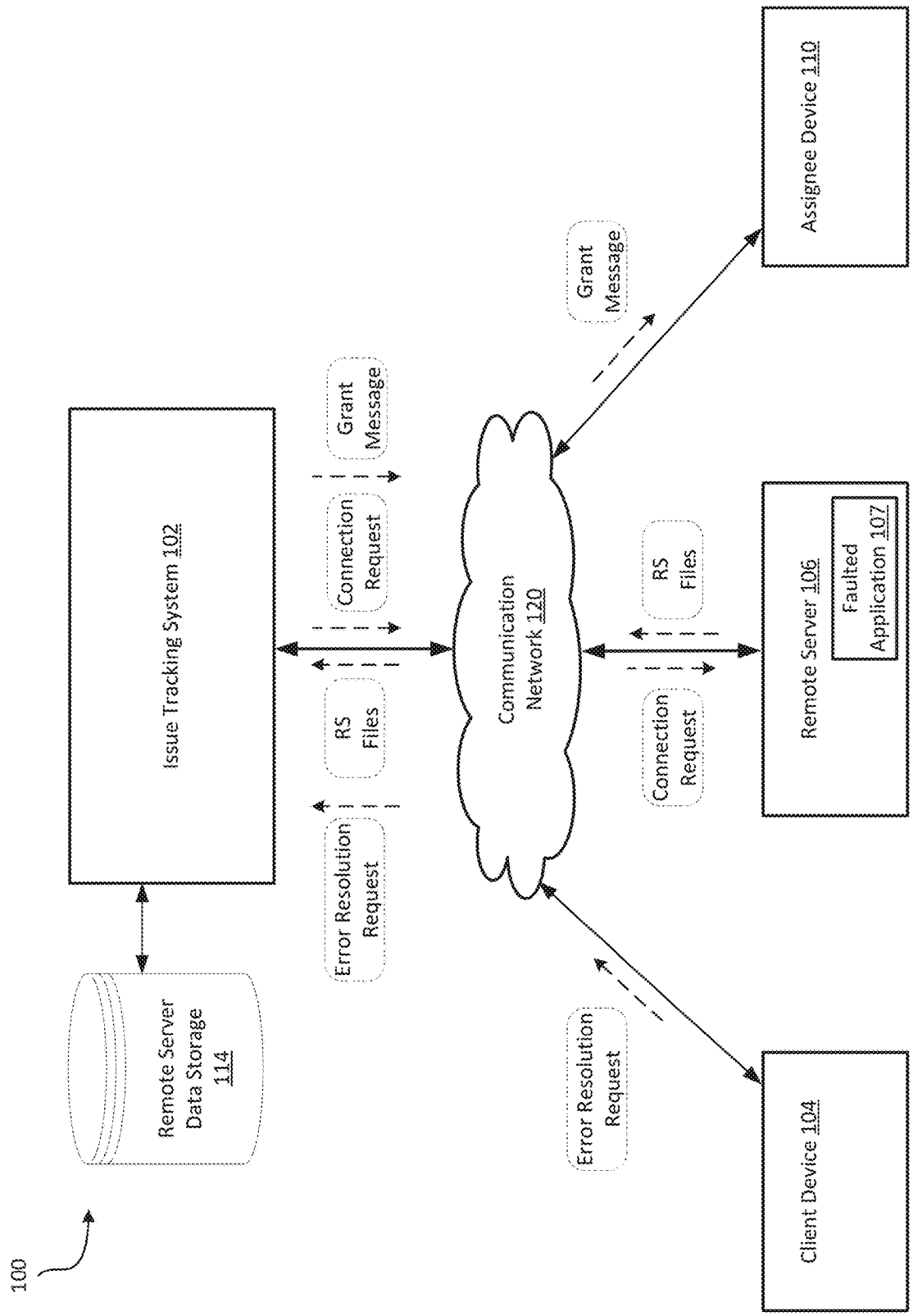
FIG. 1 is a block diagram depicting an example environment for allowing an assignee to rapidly collect data about a bug (error) that is associated with the execution of a software application on a computing device, according to some embodiments.

When a user encounters a bug with a software application that is executing on a computing device (a local or remote), the user may report the bug to a software developer (or technician) who is assigned with the task of connecting to the computing device and resolving the bug. This bug reporter may use a bug tracking software to describe the bug and to provide the assignee with logs or any other information about the bug that may be used to reproduce the bug.

Today, this interaction between the bug reporter and the assignee responsible for resolving the bug is nonoptimal because it is up to the bug reporter to provide all the information that the assignee needs in order to reproduce and solve the bug. That is, the handoff of this information makes the process of solving the bug much longer than needed. In other words, the bug reporter may become a bottleneck because the bug reporter in the conventional bug reporting process decides which information to provide to the assignee when opening the bug report, but the assignee often needs more information about the software application and its computing environment than what the bug reporter initially provided. In some instances, the assignee may send a request to the bug reporter for additional information from the computing device where the bug occurred, but must wait until the bug reporter responds to the request before proceeding with the bug resolution process. This back-and-forth interaction between the bug reporter and the assignee may happen not only in bug reports that are being opened by developers and quality engineers, but also in bug reports that are opened by actual customers of the software application.

The delay in resolving a bug with a software application may have a significant effect on a computing and networking infrastructure because the bug may consume excess processing resources, memory resources, storage resources, display resources (e.g., produces excessive pop-ups), and/or networking bandwidth. Indeed, a software application (e.g., financial software, healthcare software, government software, business software, etc.) that makes miscalculations as a result of the bug could negatively impact the lives of those people in society who rely on the decisions and outputs from the software application.

Aspects of the present disclosure address the above-noted and other deficiencies by allowing an assignee to rapidly collect data about an error (bug, fault, defect) that is associated with the execution of a software application on a computing device. As described in the below passages, an issue tracking system may receive an error resolution request from a client device to resolve an error that is associated with and/or caused by the execution of an application on a remote server, where the request includes configuration information (e.g., credentials) for connecting to the remote server and an identifier to a component that is associated with the application. In response to receiving the request, the issue tracking system may determine one or more files that are associated with the application and establish a connection to the remote server using the configuration information to retrieve the one or more files from the remote server. The issue tracking system may store the retrieved files in a remote data storage and send a notification message to an assignee device indicating that the assignee device has been granted access to the one or more files that are stored in the remote data storage. The notification message includes configuration information that the assignee device may use to connect to the remote data storage to access the one or more files for resolving the error, and in a way that bypasses the delay caused by the back-and-forth interaction between the bug reporter and assignee that often occurs in the conventional bug reporting process. Benefits of using the one or more embodiments of the present disclosure for rapidly resolving a bug with a software application may include a reduction in the consumption of computing/networking resources and the elimination of any miscalculations and/or corrupted outputs from the software application; thereby eliminating or mitigating the harm on computing/networking infrastructures and society.

FIG. 1 is a block diagram depicting an example environment for allowing an assignee to rapidly collect data about a bug (error) that is associated with the execution of a software application on a computing device, according to some embodiments. The environment 100 includes an issue tracking system 102, a client device 104, a remote server 106, an assignee device 110, and a remote server data storage 114 that are each communicably coupled together via a communication network 120. The remote server 106 includes and/or executes an application (shown in FIG. 1 as, "faulted application 107").

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g. cell towers), etc. The communication network 120 may carry communications (e.g., data, message, packets, frames, etc.) between any other the computing device.

As shown in FIG. 1, the issue tracking system 102 may receive an error resolution request (shown in FIG. 1 as, "Error Resolution Request") from the client device 104 to resolve an error (e.g., bug, fault, defect) that is associated with and/or caused by the execution of the faulted application 107 that is executing on the remote server 106. The Error Resolution (ER) request may include configuration information (e.g., credentials) for connecting to the remote server 106 and an identifier to a component that is associated with the faulted application 107.

In response to receiving the connection request, the issue tracking system 102 may determine (e.g., identify) one or more files that are associated with the component of the faulted application 107. The issue tracking system 102 may send a connection request (shown in FIG. 1 as, "Connection Request") to the remote server 106, where the connection request includes the configuration information and identifiers to the one or more files. The remote server 106 may determine whether the issue tracking system 102 has approval (e.g., authorization) to connect to the remote server 106 and retrieve the files corresponding to the file identifiers based on the information (e.g., the configuration information and/or the identifiers to the one or more files) in the connection request. If the remote server 106 determines that the issue tracking system 102 is allowed to connect to the remote server 106 and retrieve the files, then the remote server 106 accepts the connection request to form the connection; otherwise, the remote server 106 denies the connection request.

The issue tracking component 210a retrieves the one or more files (shown in FIG. 1 as, "RS Files") from the remote server 106 via the connection and stores the retrieved files in memory (e.g., memory 204a in FIG. 2A) of the issue tracking system 102 and/or the remote server data storage 114. The issue tracking component 210a may send a message (shown in FIG. 1 as, "grant message") to the assignee device 110 to indicate that the issue tracking component 210a has granted the assignee device 110 access to the retrieved files that are stored in the memory of the issue tracking system 102 and/or the remote server data storage 114. The assignee device 110 may access (e.g., read, move, copy, etc.) the retrieved files that are stored in the memory of the issue tracking system 102 and/or the remote server data storage 114, and use the retrieved files to resolve the error that is associated with and/or caused by the execution of the faulted application 107.

Although FIG. 1 shows only a select number of computing devices (e.g., issue tracking system 102, a client device 104, a remote server 106, and an assignee device 110) and data storages (e.g., remote server data storage 114); the environment 100 may include any number of computing devices and/or data storages that are interconnected in any arrangement to facilitate the exchange of data between the computing devices.

Figure 2B:
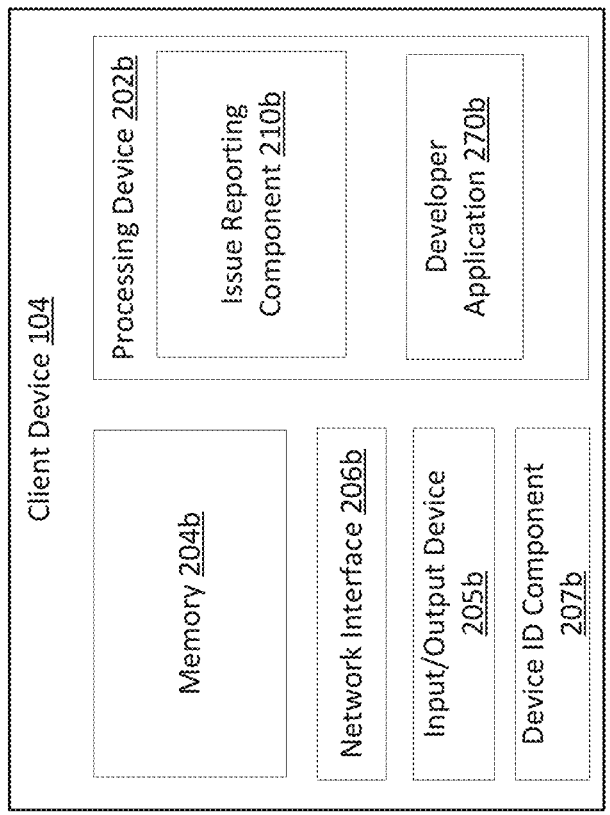
FIG. 2B is a block diagram depicting an example of a client device 104 of the environment in FIG. 1, according to some embodiments.
Figure 2A:
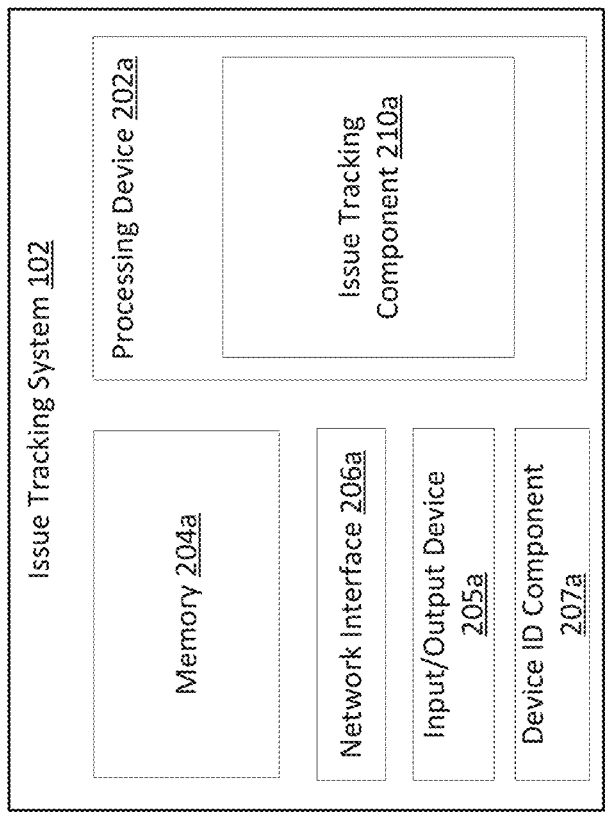
FIG. 2A is a block diagram depicting an example of the issue tracking system 102 in FIG. 1, according to some embodiments.

FIG. 2A is a block diagram depicting an example of an issue tracking system 102 in FIG. 1, according to some embodiments. While various devices, interfaces, and logic with particular functionality are shown, it should be understood that the issue tracking system 102 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The issue tracking system 102 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the issue tracking system 102. In some embodiments, the processing device 202a and the memory 204a form various processing devices and/or circuits described with respect to the issue tracking system 102. The instructions include code from any suitable computer programming language such as, but not limited to, C, C++, C#, Java, JavaScript, VBScript, Perl, HTML, XML, Python, TCL, and Basic.

The processing device 202a may execute an issue tracking component 210a. The issue tracking component 210a may be configured to receive an error resolution request (shown in FIG. 1 as, "Error Resolution Request") from the client device 104 to resolve an error (e.g., bug, fault, defect) that is associated with and/or caused by the execution of an application (e.g., faulted application 107 in FIG. 1 and FIG. 2C) on the remote server 106. In some embodiments, the Error Resolution (ER) request may include configuration information (e.g., credentials) that is associated with the remote server 106 for connecting to the remote server 106. In some embodiments, the configuration information may include a username, a password, one or more encryption keys (e.g., a public key, a private key), a session key, an internet protocol (IP) address, a network address, a remote server name, and the like.

In some embodiments, the ER request may include an identifier to a component that is associated with the faulted application 107. In some embodiments, a component that is associated with the faulted application 107 may be an internal component (e.g., included/embedded to the faulted application 107). In some embodiments, a component that is associated with the faulted application 107 may be an external component, such that the component is separate from the faulted application 107. In some embodiments, a component may be a component that the faulted application 107 accesses (e.g., read, write, copy, retrieve/move, etc.) and/or uses during the execution of the faulted application 107.

In some embodiments, the ER request may include a plurality of identifiers to a plurality of components of the faulted application 107. In some embodiments, an identifier may be a component name, a filename, a file path, a network path, a folder or directory name, a pointer (e.g., file pointer, folder pointer, library point), a memory location, a uniform resource locator (URL), or hyperlink. In some embodiments, a file pointer may be a pointer to a structure, which contains information about the file, including its name, current position of the file, whether the file is being read or written, and/or whether errors or end of the file have occurred.

In some embodiments, a component may be a dynamic link library (DLL) (e.g., a component that contains functions, computer code/instructions, and/or data that can be used by another module), a software driver (e.g., a component that provides a programming interface to control and manage a lower level interface that may be linked to physical or virtual hardware devices), a user interface component (e.g., a component used to display information in a webpage and/or application), a model component (e.g., a component that handles requests or events including business rules and/or data processing), a controller component (e.g., a component that decides what components to call for a particular request or event), a data access object or component (e.g., a component that provides an abstract interface for a database), a service component, a web service, a web resource, a plugin component (e.g., a component designed to extend the functionality of an application or system), and/or an application programming interface (API) component (e.g., a component that can be reused across multiple systems and applications that can be packaged and distributed as an API).

In some embodiments, an error that is associated with the execution of the faulted application 107 may be a compile-time error, which is encountered during the compiling and building (e.g., the process of converting source code files into executable code files) of the faulted application 107. In some embodiments, a compile-time error may include one or more of a syntax error (e.g., an error due to the fact that the syntax of the programming language is not respected), a missing command error (e.g., an error that occurs when an expected command is missing), or a semantic error (e.g., an error due to an improper use of a program statement). In some embodiments, a compile-time error may be detected by a compiler, but not resolved by the compiler.

In some embodiments, an error that is associated with the execution of the faulted application 107 may include a run-time error that is encountered during the execution of the faulted application 107 at run-time. In some embodiments, a run-time error may include one or more of a functionality error (e.g., where a behavior of the executing application varies from that which is expected), a dynamic semantic error, a logical error (e.g., incorrect data type, incorrect calculation, incorrect formulae, incorrect units), a communication error, an error handling error (e.g., missing mandatory field, saving error, page loading error, system error), a control flow error (e.g., an error associated with a software flow and/or conditional statement), boundary related error (e.g., an error due to boundaries in loop, space, time, memory, mishandling of cases outside boundary), or a crash error (e.g., a sudden failure of a software application or operating system or of a hardware device such as a hard disk caused due to failure of handling exceptions). In some embodiments, a run-time error may not be detected by a compiler.

In some embodiments, the issue tracking component 210a may be configured to determine (e.g., identify) one or more files that are associated with a component of the faulted application 107. For example, the issue tracking component 210a may determine that a network component of the faulted application 107 is associated with a first file (e.g., C:\network1.txt) and a second file (e.g., C:\network1.txt). As another example, the issue tracking component 210a may determine that a plug-in component of the faulted application 107 is associated with a first file (e.g., C:\plugin1.txt) and a second file (e.g., C:\ plugin2.txt).

In some embodiments, a file that is associated with a component of the faulted application 107 may be a file that is generated by the faulted application 107, by an operating system of the remote server 106, or by another application that is executing on the remote server 106. For example, another application that is executing on the remote server 106 may be an error monitoring and/or logging program that monitors the performance of the faulted application 107 during execution, generates files that are indicative of the performance of the faulted application 107, and stores the files on the remote server 106. In some embodiments, a file that is associated with a component of the faulted application 107 may be an error logging file that includes information about the error and information about the state of the remote server 106 (including the state of one or more applications executing on the remote server 106, the state of the operating system of the remote server 106, and the state of the physical and virtual hardware components of the remote server 106) at a predetermined time (e.g., before, during, and/or after) with respect to the occurrence of the error. In some embodiments, the faulted application 107 accessed (e.g., read, write, copy, retrieve/move, etc.) the one or more files associated with the component of the faulted application 107 prior to the occurrence of the error.

In some embodiments, the issue tracking component 210a may be configured to determine that the issue tracking component 210a does not have approval (e.g., an absence of approval) from the client device 104 to retrieve the one or more files from the remote server 106, where the issue tracking component 210a determined that the one or more files are associated with the component of the faulted application 107. In response, the issue tracking component 210a may send a request to the client device 104 for permission to access the one or more files from the remote server 106, which causes the client device 104 to send a second set of configuration information (sometimes referred to as, "updated configuration information") to the issue tracking component 210a. In some embodiments, the request causes the client device 104 to present, on a display and within an application executing on the client device 104, a notification that indicates the request for permission.

In some embodiments, different sets of configuration information may provide the issue tracking component 210a with different file-access permissions. For example, the configuration information may provide the issue tracking component 210a with access to file1.txt only, but the updated configuration information may provide the issue tracking component 210a with access to file1.txt and file2.txt.

In some embodiments, the issue tracking component 210a may receive a message from the client device 104 with configuration information that indicates that the issue tracking component 210a has permission from the client device 104 to access the requested files only, or full permission to access all files on the remote server 106 that are associated with the client device 104. In some embodiments, the issue tracking component 210a may receive a message from the client device 104 with configuration information that indicates that the issue tracking component 210a has full permission to access all files prior to receiving the request for access from the issue tracking component 210a, such that the client device 104 may automatically (e.g., without human intervention) reply to the request from the issue tracking component 210a with the permission to access all files on the remote server 106 that are associated with the client device 104.

In some embodiments, the issue tracking component 210a may be configured to acquire a permission list of a plurality of component identifiers and a plurality of file identifiers, where the permission list indicates that the issue tracking component 210a has permission from the client device 104 to access (e.g., read, write, copy, retrieve/move, etc.) the plurality of components corresponding to the plurality of component identifiers and the plurality of files corresponding to the plurality of file identifiers. In some embodiments, each component identifier in the permission list is associated with one or more file identifiers of the plurality of file identifiers in the list. In some embodiments, the issue tracking component 210a may be configured to receive the list from the client device 104. In some embodiments, the issue tracking component 210a may be configured to send a request to the client device 104 for a copy of the permission list. In some embodiments, the issue tracking component 210a may be configured to retrieve the list from a database. In some embodiments, the issue tracking component 210a may be configured to store the permission list in an internal memory (e.g., memory 204a) or an external database (e.g., remote server data storage 114 in FIG. 1).

In some embodiments, the issue tracking component 210a may be configured to determine the one or more files associated with the component of the application based on the permission list. For example, the issue tracking component 210a may receive an ER request from the client device 104 to resolve an error that occurs during the execution of the faulted application 107 on the remote server 106, where the request includes an identifier to a network component. In response, the issue tracking component 210a may search the permission list for the component identifier corresponding to the network component, and if found, extract the file identifiers that are associated (e.g., linked, paired, coupled) with the network component.

In some embodiments, the issue tracking component 210a may be configured to establish a connection to the remote server 106 using the configuration information and/or the updated configuration information. In some embodiments, the issue tracking component 210a may be configured to send a connection request (shown in FIG. 1 as, "Connection Request") to the remote server 106, where the connection request includes the configuration information, an identifier to the remote server 106, and/or one or more file identifiers (e.g., filename1, filename2, etc.). In response, the remote server 106 may determine whether the issue tracking component 210a has approval (e.g., authorization) to connect to the remote server 106 and retrieve the files corresponding to the file identifiers based on the connection request. If the remote server 106 determines that the issue tracking component 210a is allowed to connect to the remote server 106 and retrieve the files, then the remote server 106 accepts the connection request to form the connection; otherwise, the remote server 106 denies the connection request.

In some embodiments, the issue tracking component 210a may be configured to prevent the client device 104 (or any other computing device) from connecting to the remote server 106 and modifying the state of the remote server 106 before an assignee has an opportunity to connect to and analyze the faulted application 107. In some embodiments, the issue tracking component 210a may be configured to send a message to the remote server 106, where the message disables (e.g., power-down, take offline, etc.) the remote server 106. In some embodiments, the issue tracking component 210a may be configured to send a message to the remote server 106 to cause the remote server 106 to deny a connection request from the client device 104.

In some embodiments, the issue tracking component 210a may be configured to receive a request from the assignee device 110 to access to an additional file on the remote server 106. In some embodiments, the issue tracking component 210a may be configured to retrieve the additional file from the remote server 106. In some embodiments, the issue tracking component 210a may be configured to send a message (shown in FIG. 1 as, "grant message") to the assignee device 110 to indicate that issue tracking component 210a has granted the assignee device 110 access to the additional file that was retrieved from the remote server 106.

In some embodiments, the issue tracking component 210a may be configured to send to the client device 104, responsive to receiving the request for access to the additional file from the assignee device 110, a request for access to the additional file on the remote server 106. In some embodiments, the issue tracking component 210a may be configured to receive, from the client device, a second message indicating that the processing device has permission to access the additional file from the remote server.

In some embodiments, the issue tracking component 210a may be configured to grant the assignee device 110 access to the files that the issue tracking component 210a retrieves from the remote server 106 by storing the retrieved files in the remote server data storage 114 and sending a message to the assignee device 110, where the message indicates an availability of the retrieved files on the database. In some embodiments, the issue tracking component 210a may be configured to grant the assignee device 110 access to the files that the issue tracking component 210a retrieves from the remote server 106 by sending, to the assignee device 110, the retrieved files or an identifier (e.g., a pointer, a hyperlink, a file path, etc.) to the retrieved files. For example, the issue tracking component 210a may send a message to the assignee device 110, where the message includes a file path to the retrieved file that is stored on the remote server data storage 114.

The issue tracking system 102 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the issue tracking system 102 includes a plurality of network interfaces 206a of different types, allowing for connections to a variety of networks, such as local area networks (public or private) or wide area networks including the Internet, via different sub-networks.

The issue tracking system 102 includes an input/output device 205a configured to receive user input from and provide information to a user. In this regard, the input/output device 205a is structured to exchange data, communications, instructions, etc. with an input/output component of the issue tracking system 102. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of issue tracking system 102, such as a built-in display, touch screen, microphone, etc., or external to the housing of issue tracking system 102, such as a monitor connected to issue tracking system 102, a speaker connected to issue tracking system 102, etc., according to various embodiments. In some embodiments, the input/output device 205a includes communication circuitry for facilitating the exchange of data, values, messages, and the like between the input/output device 205a and the components of the issue tracking system 102. In some embodiments, the input/output device 205a includes machine-readable media for facilitating the exchange of information between the input/output device 205a and the components of the issue tracking system 102. In still another embodiment, the input/output device 205a includes any combination of hardware components (e.g., a touchscreen), communication circuitry, and machine-readable media.

The issue tracking system 102 includes a device identification component 207a (shown in FIG. 2A as device ID component 207a) configured to generate and/or manage a device identifier associated with issue tracking system 102. The device identifier may include any type and form of identification used to distinguish the issue tracking system 102 from other computing devices. In some embodiments, to preserve privacy, the device identifier may be cryptographically generated, encrypted, or otherwise obfuscated by any device and/or component of issue tracking system 102. In some embodiments, the issue tracking system 102 may include the device identifier in any communication (e.g., a request, blockchain data, supply chain data request, etc.) that the issue tracking system 102 sends to a computing device.

The issue tracking system 102 includes a bus (not shown), such as an address/data bus or other communication mechanism for communicating information, which interconnects the devices and/or components of issue tracking system 102, such as processing device 202a, network interface 206a, input/output device 205a, device ID component 207a, and issue tracking component 210a.

In some embodiments, some or all of the devices and/or components of issue tracking system 102 may be implemented with the processing device 202a. For example, the issue tracking component 210a may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of a client device 104 of the environment in FIG. 1, according to some embodiments. While various devices, interfaces, and logic with particular functionality are shown, it should be understood that the client device 104 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The client device 104 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the client device 104 instead of devices and/or components of the issue tracking system 102.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the client device 104 instead of devices and/or components of the issue tracking system 102.

The processing device 202b may execute an issue reporting component 210b that may be configured to send a request to the issue tracking system 102 to resolve an error associated with the execution of the faulted application 107 on the remote server 106. In some embodiments, the request may include configuration information for connecting to the remote server 106 and/or an identifier to a component of the faulted application 107.

In some embodiments, the issue reporting component 210b may be configured to receive a request from the issue tracking system 102 for access to one or more files on the remote server 106. In some embodiments, the issue reporting component 210b may be configured to generate and send updated configuration information to the issue tracking system 102, where the configuration information indicates that the issue tracking system 102 has permission to access the one or more files from the remote server 106.

In some embodiments, the issue reporting component 210b may be configured to generate a permission list of a plurality of component identifiers and a plurality of file identifiers, where the permission list indicates that the issue tracking system 102 has permission from the client device 104 to access (e.g., read, write, copy, retrieve/move, etc.) the plurality of components corresponding to the plurality of component identifiers and the plurality of files corresponding to the plurality of file identifiers. In some embodiments, each component identifier in the permission list is associated with one or more file identifiers of the plurality of file identifiers in the list.

In some embodiments, the issue reporting component 210b may be configured to receive a request from the issue tracking system 102 for a copy of the permission list, and in response, send the permission list to issue tracking system 102. In some embodiments, the issue reporting component 210b may be configured to receive a request from the issue tracking system 102 to access an additional file on the remote server. In some embodiments, the additional file is not identified in the permission list is available (e.g., stored in memory 204a or remote server data storage 114) to the issue tracking system 102. In some embodiments, the issue reporting component 210b may be configured to send a message (sometimes referred to as, "second message") to the issue tracking system 102, where the message indicates that the issue tracking system 102 has permission to access the additional file from the remote server 106.

The processing device 202b may include and/or execute an application (shown in FIG. 2B as, "Developer Application 270b") that is displayed on a computer screen of the client device 104, and is configured to allow a user of the client device 104 to establish a connection with any other computing device that is connected to the communication network 120 for sending/receiving data (e.g., error resolution requests, client data, etc.). In some embodiments, the developer application 270b is configured to allow a user of the client device 104 (via the connection) to modify the faulted application 107 and/or execute the faulted application 107. For example, a user of client device 104 may edit the source code of faulted application 107, compile the source code of faulted application 107 to generate an executable code, and execute the executable code. In some embodiments, the developer application 270b is configured to display information (e.g., notifications, messages, permission requests, outputs from the faulted application 107, graphical-screen updates from the remote server 106, etc.) that the client device 104 receives from any other computing device (e.g., issue tracking system 102). The developer application 270b may be an internet/web browser, a graphic user interface (GUI), an email reader/client, a File Transfer Protocol (FTP) client, a virtual machine application, a desk-sharing application (e.g., configured in a server-mode or a client-mode), or a software application that is separate from an internet/web browser.

In some embodiments, the developer application 270b may be a software bug (e.g., error, fault, defect) tracking application that keeps track of a reported software bug in a software development project. In some embodiments, the developer application 270b may include a first software button (e.g., labeled as "open a bug") for allowing a user of the client device 104 to open a bug to submit to the issue tracking system 102, which causes a software screen to appear within the developer application 270b. In some embodiments, the software screen may include a drop-down menu for allowing the user to select the type of environment (e.g., server, continuous integration and delivery (CI/CD) system, etc.) that is executing on the remote server 106. In some embodiments, the software screen may include an entry field for allowing the user to enter the configuration information (e.g., relevant credentials, authorization information) to connect to the environment executing on the remote server 106. In some embodiments, the software screen may include a second software button (e.g., labeled as "submit user information") for allowing a user of the client device 104 to send the information that the user has entered into the software screen of the developer application 270b to the issue tracking system 102.

In some embodiments, once connected successfully, the issue tracking system 102 may ask the user of the client device 104 whether it can collect specific, relevant information as was pre-configured for the specific component or produced by the owner. In some embodiments, in order for the issue tracking system 104 to pull only the information it needs for the assignee to solve the bug, someone (e.g., a component and/or owner in the issue tracking system 104) may need to define a list of commands/files to run/collect for every issue that is opened for a specific component. For example, if the software application is product 'A', a user may want to pull every time there is a computing device that is connected to the bug, the files regarding the networking and component services. If the software application is product 13', then the user may want to collect information on a container platform.

The client device 104 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the client device 104 instead of devices and/or components of the issue tracking system 102.

The client device 104 includes an input/output device 205b configured to receive user input from and provide information to a user. In this regard, the input/output device 205b is structured to exchange data, communications, instructions, etc. with an input/output component of the client device. The input/output device 205b includes identical or nearly identical functionality as input/output processor 205a in FIG. 2A, but with respect to devices and/or components of the client device 104 instead of devices and/or components of the issue tracking system 102.

The client device 104 includes a device identification component 207b (shown in FIG. 2B as device ID component 207b) configured to generate and/or manage a device identifier associated with the client device 104. The device ID component 207b includes identical or nearly identical functionality as device ID component 207a in FIG. 2A, but with respect to devices and/or components of the client device 104 instead of devices and/or components of the issue tracking system 102.

The client device 104 includes a bus (not shown), such as an address/data bus or other communication mechanism for communicating information, which interconnects the devices and/or components of the client device 104, such as processing device 202b, network interface 206b, input/output device 205b, device ID component 207b, and the issue reporting component 210b.

In some embodiments, some or all of the devices and/or components of client device 104 may be implemented with the processing device 202b. For example, the client device 104 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

Figure 2D:
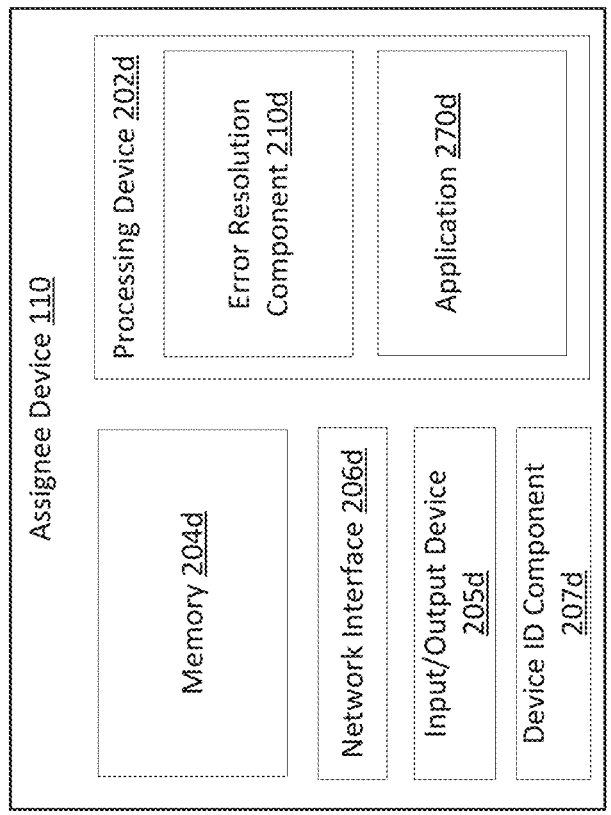
FIG. 2D is a block diagram depicting an example of an assignee device 110 of the environment in FIG. 1, according to some embodiments.
Figure 2C:
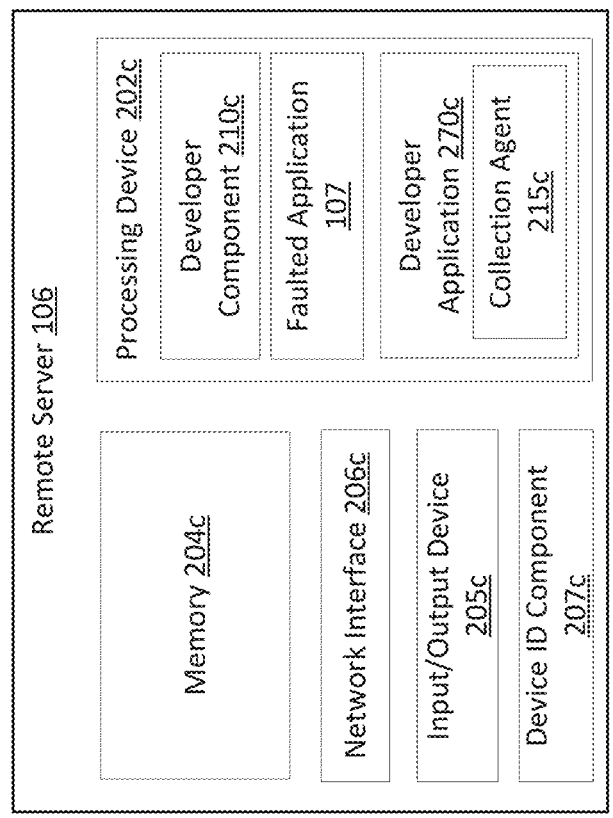
FIG. 2C is a block diagram depicting an example of the remote server 106 of the environment in FIG. 1, according to some embodiments.

FIG. 2C is a block diagram depicting an example of a remote server 106 of the environment in FIG. 1, according to some embodiments. While various devices, interfaces, and logic with particular functionality are shown, it should be understood that the remote server 106 includes any number of devices and/or components, interfaces, and logic for facilitating the functions described herein. For example, the activities of multiple devices may be combined as a single device and implemented on a same processing device (e.g., processing device 202c), as additional devices and/or components with additional functionality are included.

The remote server 106 includes a processing device 202c (e.g., general purpose processor, a PLD, etc.), which may be composed of one or more processors, and a memory 204c (e.g., synchronous dynamic random access memory (DRAM), read-only memory (ROM)), which may communicate with each other via a bus (not shown). The processing device 202c includes identical or nearly identical functionality as processing device 202a in FIG. 2a, but with respect to devices and/or components of the remote server 106 instead of devices and/or components of the issue tracking system 102.

The memory 204c of processing device 202c stores data and/or computer instructions/code for facilitating at least some of the various processes described herein. The memory 204c includes identical or nearly identical functionality as memory 204a in FIG. 2A, but with respect to devices and/or components of the remote server 106 instead of devices and/or components of the issue tracking system 102.

The remote server 106 includes a network interface 206c configured to establish a communication session with a computing device for sending and receiving data over a network to the computing device. Accordingly, the network interface 206c includes identical or nearly identical functionality as network interface 206a in FIG. 2A, but with respect to devices and/or components of the remote server 106 instead of devices and/or components of the issue tracking system 102.

The remote server 106 includes an input/output device 205c configured to receive user input from and provide information to a user. In this regard, the input/output device 205c is structured to exchange data, communications, instructions, etc. with an input/output component of the remote server 106. The input/output device 205c includes identical or nearly identical functionality as input/output processor 205a in FIG. 2A, but with respect to devices and/or components of the remote server 106 instead of devices and/or components of the issue tracking system 102.

The remote server 106 includes a device identification component 207c (shown in FIG. 2C as device ID component 207c) configured to generate and/or manage a device identifier associated with the remote server 106. The device ID component 207c includes identical or nearly identical functionality as device ID component 207a in FIG. 2A, but with respect to devices and/or components of the remote server 106 instead of devices and/or components of the issue tracking system 102.

The processing device 202c may include and/or execute an application (shown in FIG. 2C as, "Developer Application 270c") that is displayed on a computer screen of the remote server 106, and is configured to establish a connection (in response to receiving a connection request) with any other computing device that is connected to the communication network 120 for sending/receiving data (e.g., error resolution requests, client data, etc.). The developer application 270c includes identical or nearly identical functionality as developer application 270b in FIG. 2B, but with respect to devices and/or components of the remote server 106 instead of devices and/or components of the client device 104.

The developer application 270c includes a collection agent 215c for capturing a state of the remote server 106 and any applications (e.g., developer application 270c, faulted application 107) executing on the remote server 106. The collection agent 215c may include an application plug-in, application extension, subroutine, browser toolbar, daemon, or other executable logic for collecting data processed by the developer application 270c and/or monitoring interactions of user with the input/output device 205c. In other embodiments, the collection agent 215c may be a separate application, service, daemon, routine, or other executable logic separate from the developer application 270c but configured for intercepting and/or collecting data processed by developer application 270c, such as a screen scraper, packet interceptor, application programming interface (API) hooking process, or other such application. The collection agent 215c is configured for intercepting or receiving data input via the input/output device 205c, including mouse clicks, scroll wheel movements, gestures such as swipes, pinches, or touches, or any other such interactions; as well as data received and processed by the developer application 270c. The collection agent 215c is configured to pass any data that it intercepts, gathers, and/or receives data to the developer application 270c to be presented in the developer application 270c (e.g., on a display/monitor) and/or for the developer application 270c to send the data to any other computing device. The collection agent 215c, may begin intercepting, gathering, and/or receiving data input via its respective input/output device in view of any triggering event, including, e.g., a power-up of the remote server 106 or a launch of any application (e.g., developer application 270c, faulted application 107) executing on a processing device of the remote server 106.

The processing device 202c may include and/or execute an application (shown in FIG. 2C as, "Faulted Application 107") that is displayed on a computer screen of the remote server 106. The faulted application 107 may be an application that is or has undergoing one or more stages of a software development process for the purpose of developing the application into a final product for private use, public use, and/or commercial use. For example, a user of the client device 104 may establish a connection between the developer application 270b executing on the client device 104 and the developer application 270c executing on the remote server 106, and send instructions through the connection to edit and/or execute the faulted application 107. In some embodiments, the execution of the faulted application 107 may generate and/or encounter one or more errors. In some embodiments, the faulted application 107 may execute without the occurrence of any errors.

The processing device 202c may execute a developer component 210c. In some embodiments, the developer component 210c may be configured to receive a connection request from a computing device (e.g., the issue tracking system 102, the client device 104), where the connection request includes configuration information, and/or one or more file identifiers. In response, the developer component 210c may determine whether the computing device has approval to connect to the remote server 106 and retrieve the files corresponding to the file identifiers based on the connection request. If the developer component 210c determines that the computing device is allowed to connect to the remote server 106 and retrieve the files, then the developer component 210c accepts the connection request to form the connection; otherwise, the developer component 210c denies the connection request.

In some embodiments, the developer component 210c may be configured to receive a message that requests for the developer component 210c to disable (e.g., power-down, take offline, etc.) the remote server 106, and in response, the developer component 210c disables the remote server 106. In some embodiments, the developer component 210c may be configured to receive a message requesting the developer component 210c to deny connection requests from the client device 104 components, and in response, the developer component 210c denies connection requests from the client device 104. In some embodiments, the developer component 210c may be configured to receive a message requesting the developer component 210c to accept connection requests from the client device 104, and in response, the developer component 210c accepts connection requests from the client device 104.

The remote server 106 includes a bus (not shown), such as an address/data bus or other communication mechanism for communicating information, which interconnects the devices and/or components of the remote server 106, such as processing device 202c, network interface 206c, input/output device 205c, device ID component 207c, the developer application 270c, the faulted application 107, and the developer component 210c.

In some embodiments, some or all of the devices and/or components of the remote server 106 may be implemented with the processing device 202c. For example, the remote server 106 may be implemented as a software application stored within the memory 204c and executed by the processing device 202c. Accordingly, such embodiment can be implemented with minimal or no additional hardware costs. In some embodiments, any of these above-recited devices and/or components rely on dedicated hardware specifically configured for performing operations of the devices and/or components.

FIG. 2D is a block diagram depicting an example of an assignee device 110 of the environment in FIG. 1, according to some embodiments. While various devices, interfaces, and logic with particular functionality are shown, it should be understood that the assignee device 110 includes any number of devices and/or components, interfaces, and logic for facilitating the functions described herein. For example, the activities of multiple devices may be combined as a single device and implemented on a same processing device (e.g., processing device 202d), as additional devices and/or components with additional functionality are included.

The assignee device 110 includes a processing device 202d (e.g., general purpose processor, a PLD, etc.), which may be composed of one or more processors, and a memory 204d (e.g., synchronous dynamic random access memory (DRAM), read-only memory (ROM)), which may communicate with each other via a bus (not shown). The processing device 202d includes identical or nearly identical functionality as processing device 202a in FIG. 2a, but with respect to devices and/or components of the assignee device 110 instead of devices and/or components of the issue tracking system 102.

The memory 204d of processing device 202d stores data and/or computer instructions/code for facilitating at least some of the various processes described herein. The memory 204d includes identical or nearly identical functionality as memory 204a in FIG. 2A, but with respect to devices and/or components of the assignee device 110 instead of devices and/or components of the issue tracking system 102.

The assignee device 110 includes a network interface 206d configured to establish a communication session with a computing device for sending and receiving data over a network to the computing device. Accordingly, the network interface 206d includes identical or nearly identical functionality as network interface 206a in FIG. 2A, but with respect to devices and/or components of the assignee device 110 instead of devices and/or components of the issue tracking system 102.

The assignee device 110 includes an input/output device 205d configured to receive user input from and provide information to a user. In this regard, the input/output device 205d is structured to exchange data, communications, instructions, etc. with an input/output component of the assignee device 110. The input/output device 205d includes identical or nearly identical functionality as input/output processor 205a in FIG. 2A, but with respect to devices and/or components of the assignee device 110 instead of devices and/or components of the issue tracking system 102.

The assignee device 110 includes a device identification component 207d (shown in FIG. 2D as device ID component 207d) configured to generate and/or manage a device identifier associated with the assignee device 110. The device ID component 207d includes identical or nearly identical functionality as device ID component 207a in FIG. 2A, but with respect to devices and/or components of the assignee device 110 instead of devices and/or components of the issue tracking system 102.

The processing device 202d may include and/or execute an application (shown in FIG. 2D as, "Developer Application 270d") that is displayed on a computer screen of the assignee device 110. The developer application 270d includes identical or nearly identical functionality as developer application 270b in FIG. 2B, but with respect to devices and/or components of the assignee device 110 instead of devices and/or components of the client device 104.

The processing device 202d may execute an error resolution component 210d. In some embodiments, the error resolution component 210d may be configured to receive a message indicating that the assignee device 110 is granted access to one or more files that are stored on the issue tracking system 102 or the remote server data storage 114. In some embodiments, the error resolution component 210d may be configured to retrieve the one or more files from the memory of the issue tracking system 102 or the remote server data storage 114 responsive to receiving the message. In some embodiments, the error resolution component 210d may be configured to receive one or more files from the issue tracking system 104.

The assignee device 110 includes a bus (not shown), such as an address/data bus or other communication mechanism for communicating information, which interconnects the devices and/or components of the assignee device 110, such as processing device 202d, network interface 206d, input/output device 205d, device ID component 207d, the developer application 270d, and the error resolution component 210d.

In some embodiments, some or all of the devices and/or components of the assignee device 110 may be implemented with the processing device 202d. For example, the assignee device 110 may be implemented as a software application stored within the memory 204d and executed by the processing device 202d. Accordingly, such embodiment can be implemented with minimal or no additional hardware costs. In some embodiments, any of these above-recited devices and/or components rely on dedicated hardware specifically configured for performing operations of the devices and/or components.

Figure 3:
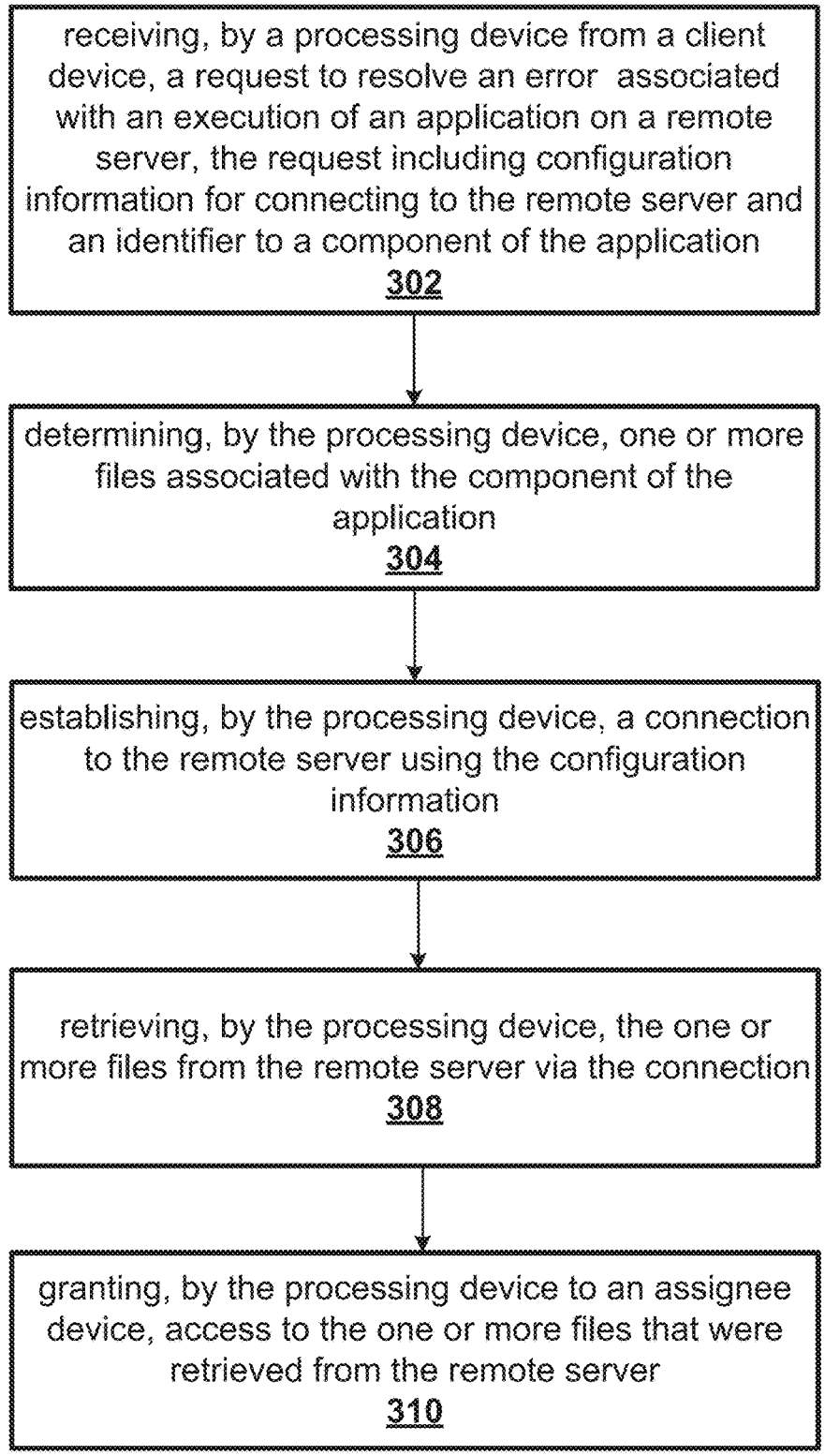
FIG. 3 is a flow diagram depicting a method for allowing an assignee to rapidly collect data about a bug (error) that is associated with the execution of a software application on a computing device, according to some embodiments.

FIG. 3 is a flow diagram depicting a method for allowing an assignee to rapidly collect data about a bug (error) that is associated with the execution of a software application on a computing device, according to some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 300 may be performed by an issue tracking system, such as issue tracking system 102 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of receiving, by a processing device from a client device, a request to resolve an error associated with an execution of an application on a remote server, the request including configuration information for connecting to the remote server and an identifier to a component of the application. The method 300 includes the block 304 of determining, by the processing device, one or more files associated with the component of the application. The method 300 includes the block 306 of establishing, by the processing device, a connection to the remote server using the configuration information. The method 300 includes the block 308 of retrieving, by the processing device, the one or more files from the remote server via the connection. The method 300 includes the block 310 of granting, by the processing device to an assignee device, access to the one or more files that were retrieved from the remote server.

Figure 4:
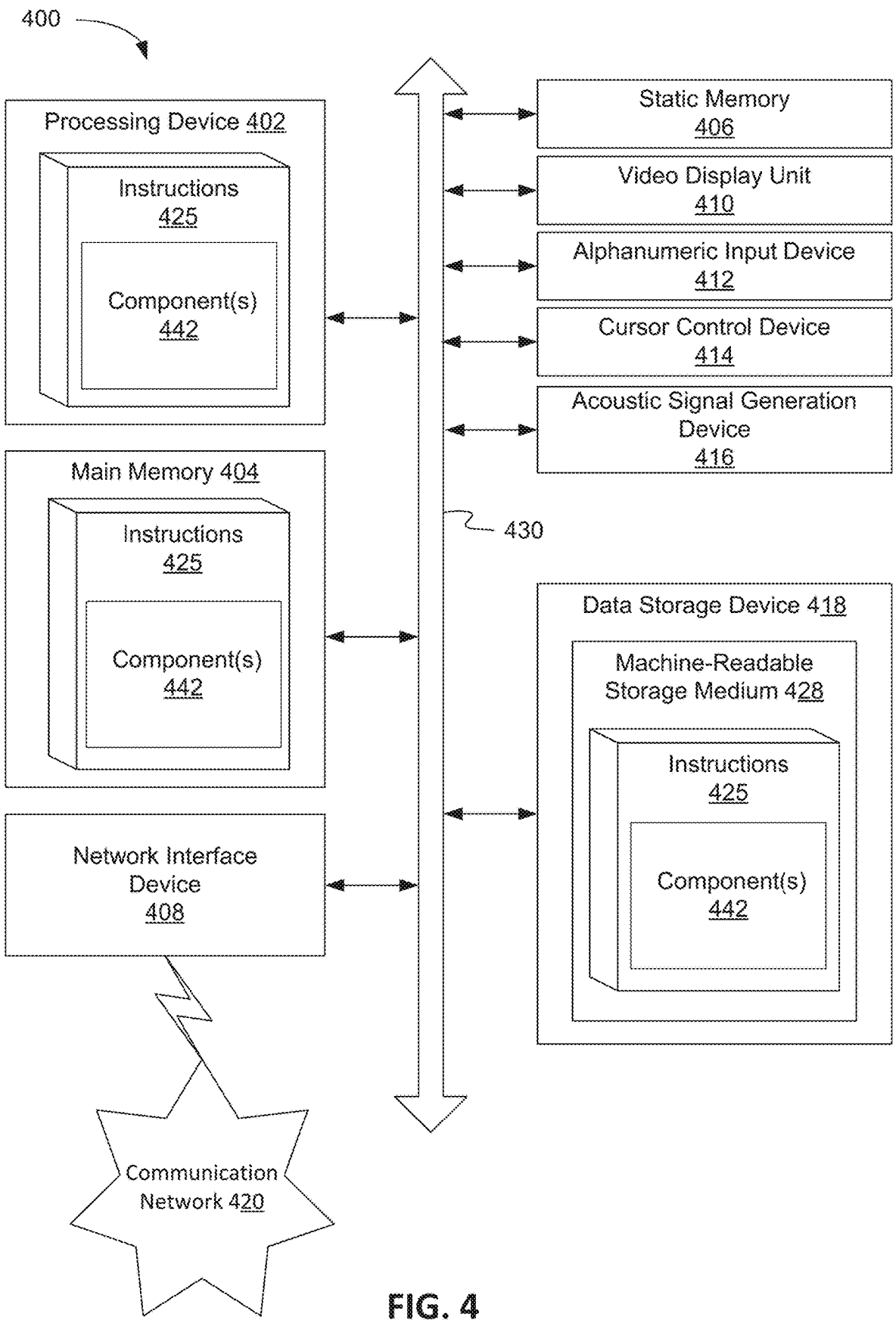
FIG. 4 is a block diagram of an example computing device that may perform one or more of the operations described herein, in accordance with some embodiments.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components 142 (e.g., issue tracking component 210a in FIG. 2A, issue reporting component 210b in FIG. 2B, developer component 210c in FIG. 2C, and/or error resolution component 210d in FIG. 2D) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "establishing," "retrieving," "granting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, by a processing device from a client device, a request to resolve an error associated with an execution of an application on a remote server, the request including configuration information to connect to the remote server and an identifier to a component of the application;
   determining one or more files associated with the component of the application based on a list of a plurality of component names and a plurality of file names;
   establishing a connection to the remote server using the configuration information;
   retrieving the one or more files from the remote server via the connection; and
   granting, to an assignee device, access to the one or more files that were retrieved from the remote server.

2. The method of claim 1, wherein the granting access to the retrieved files comprises:
   storing, by the processing device, the retrieved files in a database; and
   sending, by the processing device to the assignee device, a message indicating an availability of the retrieved files on the database.

3. The method of claim 1, wherein the granting access to the retrieved files comprises:
   sending, by the processing device to the assignee device, the retrieved files or an identifier to the retrieved files.

4. The method of claim 1, further comprising:
   determining, by the processing device, an absence of a permission from the client device to retrieve the one or more files from the remote server;

sending, by the processing device to the client device responsive to determining the absence of the permission, a request for access to the one or more files from the remote server; and receiving, by the processing device from the client device, updated configuration information indicating that the processing device has permission to access the one or more files from the remote server.

5. The method of claim 4, wherein establishing a connection to the remote server using the configuration information comprises:

establishing, by the processing device, a connection to the remote server using the updated configuration information.

6. The method of claim 1, wherein determining the one or more files associated with the component of the application comprises:

receiving, by the processing device from the client device, the list of the plurality of component names and the plurality of file names, each component name is associated with one or more file names of the plurality of file names.

7. The method of claim 1, wherein the component of the application corresponds to at least one of a dynamic link library (DLL), a software driver, a user interface component, a model component for handling requests or events, a controller component for determining components for calling a request or an event, a data access object for providing an interface for databases, a service component, a plugin component, or an application programming interface (API) component.

8. The method of claim 1, further comprising:

preventing, by the processing device responsive to receiving the request to resolve the error associated with the execution of the application on the remote server, the client device from connecting to the remote server by disabling the remote server, or sending a second message to the remote server to cause the remote server to deny a connection request from the client device.

9. The method of claim 1, further comprising:

receiving, by the processing device from the assignee device, a request for access to an additional file on the remote server;

retrieving, by the processing device, the additional file from the remote server; and granting, by the processing device to the assignee device, access to the additional file that was retrieved from the remote server.

10. The method of claim 9, further comprising:

sending, by the processing device to the client device responsive to receiving the request for access to the additional file from the assignee device, a request for access to the additional file on the remote server; and receiving, by the processing device from the client device, a second message indicating that the processing device has permission to access the additional file from the remote server.

11. A system comprising:

a memory; and a processing device, operatively coupled to the memory, to:

receive, from a client device, a request to resolve an error associated with an execution of an application on a remote server, the request including configuration information for connecting to the remote server and an identifier to a component of the application;

determine one or more files associated with the component of the application based on a list of a plurality of component names and a plurality of file names;

establish a connection to the remote server using the configuration information;

retrieve the one or more files from the remote server via the connection; and grant, to an assignee device, access to the one or more files that were retrieved from the remote server.

12. The system of claim 11, wherein the processing device is further to:

store the retrieved files in a database; and send, to the assignee device, a message indicating an availability of the retrieved files on the database.

13. The system of claim 11, wherein the processing device is further to:

send, to the assignee device, the retrieved files or an identifier to the retrieved files.

14. The system of claim 11, wherein the processing device is further to:

determine an absence of a permission from the client device to retrieve the one or more files from the remote server;

send, to the client device responsive to determining the absence of the permission, a request for access to the one or more files from the remote server; and receive, from the client device, updated configuration information indicating that the processing device has permission to access the one or more files from the remote server.

15. The system of claim 14, wherein the processing device is further to:

establish a connection to the remote server using the updated configuration information.

16. The system of claim 11, wherein the processing device is further to:

receive, from the client device, the list of the plurality of component names and the plurality of file names, each component name is associated with one or more file names of the plurality of file names.

17. The system of claim 11, wherein the component of the application corresponds to at least one of a dynamic link library (DLL), a software driver, a user interface component, a model component for handling requests or events, a controller component for determining components for calling a request or an event, a data access object for providing an interface for databases, a service component, a plugin component, or an application programming interface (API) component.

18. The system of claim 11, wherein the processing device is further to:

prevent, responsive to receiving the request to resolve the error associated with the execution of the application on the remote server, the client device from connecting to the remote server by disabling the remote server, or sending a second message to the remote server to cause the remote server to deny a connection request from the client device.

19. The system of claim 11, wherein the processing device is further to:

receive, from the assignee device, a request for access to an additional file on the remote server;

retrieve the additional file from the remote server; and granting, by the processing device to the assignee device, access to the additional file that was retrieved from the remote server.

20. A non-transitory computer-readable medium storing instructions that, when executed by a processing device, cause the processing device to:
- receive, by the processing device from a client device, a request to resolve an error associated with an execution of an application on a remote server, the request including configuration information for connecting to the remote server and an identifier to a component of the application;
- determine one or more files associated with the component of the application based on a list of a plurality of component names and a plurality of file names;
- establish a connection to the remote server using the configuration information;
- retrieve the one or more files from the remote server via the connection; and
- grant, to an assignee device, access to the one or more files that were retrieved from the remote server.

* * * * *